(12) United States Patent
Lee et al.

(10) Patent No.: US 10,158,573 B1
(45) Date of Patent: Dec. 18, 2018

(54) FORWARDING ELEMENT WITH A DATA PLANE LOAD BALANCER

(71) Applicant: Barefoot Networks, Inc., Palo Alto, CA (US)

(72) Inventors: Jeongkeun Lee, Mountain View, CA (US); Changhoon Kim, Palo Alto, CA (US)

(73) Assignee: BAREFOOT NETWORKS, INC., Santa Clara, CA (US)

(*) Notice: Subject to any disclaimer, the term of this patent is extended or adjusted under 35 U.S.C. 154(b) by 37 days.

(21) Appl. No.: 15/600,752

(22) Filed: May 21, 2017

Related U.S. Application Data

(60) Provisional application No. 62/492,908, filed on May 1, 2017.

(51) Int. Cl.
| | |
|---|---|
| *G06F 15/16* | (2006.01) |
| *H04L 12/803* | (2013.01) |
| *H04L 29/08* | (2006.01) |
| *H04L 29/06* | (2006.01) |

(52) U.S. Cl.
CPC ........ *H04L 47/125* (2013.01); *H04L 65/1069* (2013.01); *H04L 67/1002* (2013.01)

(58) Field of Classification Search
CPC .............. H04L 47/125; H04L 65/1069; H04L 67/1002
See application file for complete search history.

(56) References Cited

U.S. PATENT DOCUMENTS

| | | |
|---|---|---|
| 5,757,795 A | 5/1998 | Schnell |
| 6,625,612 B1 | 9/2003 | Tal et al. |
| 6,754,662 B1 | 6/2004 | Li |
| 9,529,531 B2 | 12/2016 | Bosshart et al. |
| 9,565,114 B1 | 2/2017 | Kabbani et al. |
| 9,571,400 B1 | 2/2017 | Mandal et al. |

(Continued)

OTHER PUBLICATIONS

Alizadeh, Mohammad, et al., "CONGA: Distributed Congestion-Aware Load Balancing for Datacenters," SIGCOMM'14, Aug. 17-22, 2014, 12 pages, ACM, Chicago, IL, USA.

(Continued)

*Primary Examiner* — Jonathan A Bui
(74) *Attorney, Agent, or Firm* — Adeli LLP

(57) ABSTRACT

Some embodiments of the invention provide a forwarding element that has a data-plane circuit (data plane) that can be configured to implement one or more load balancers. The data plane has several stages of configurable data processing circuits, which are typically configured to process data tuples associated with data messages received by the forwarding element in order to forward the data messages within a network. However, in some embodiments, the configurable data processing circuits of the data plane can also be configured to implement a load balancer in the data plane that forwards message flows to different nodes of a node group. This load balancer includes a set of one or more storages to store several address mapping sets with each address mapping set corresponding to a different set of nodes in the node group. It also includes a destination selector that receives a set identifier for each message flow, and selects a node for the message flow from the mapping set identified by the set identifier received for the message flow.

13 Claims, 4 Drawing Sheets

(56) References Cited

U.S. PATENT DOCUMENTS

| | | | |
|---|---|---|---|
| 9,608,913 | B1 | 3/2017 | Kabbani et al. |
| 9,712,439 | B2 | 7/2017 | Bosshart et al. |
| 9,876,719 | B2 | 1/2018 | Revah et al. |
| 10,063,479 | B2 | 8/2018 | Kim et al. |
| 2003/0126233 | A1 | 7/2003 | Bryers et al. |
| 2005/0013280 | A1 | 1/2005 | Buddhikot et al. |
| 2006/0112237 | A1 | 5/2006 | Chen et al. |
| 2006/0245361 | A1 | 11/2006 | Cheethirala et al. |
| 2009/0041017 | A1 | 2/2009 | Luk |
| 2013/0297798 | A1 | 11/2013 | Arisoylu et al. |
| 2014/0241362 | A1 | 8/2014 | Bosshart et al. |
| 2014/0244966 | A1 | 8/2014 | Bosshart et al. |
| 2014/0328180 | A1 | 11/2014 | Kim et al. |
| 2014/0334489 | A1 | 11/2014 | Bosshart et al. |
| 2014/0372388 | A1 | 12/2014 | Attaluri et al. |
| 2014/0372616 | A1* | 12/2014 | Arisoylu ............ H04L 67/1002 709/226 |
| 2014/0376555 | A1 | 12/2014 | Choi, II et al. |
| 2015/0039823 | A1 | 2/2015 | Chen |
| 2016/0099872 | A1 | 4/2016 | Kim et al. |
| 2017/0289034 | A1 | 10/2017 | Bosshart et al. |

OTHER PUBLICATIONS

Fan, Bin, et al., "Cuckoo Filter: Practically Better Than Bloom," CoNEXT'14, Dec. 2-5, 2014, 13 pages, ACM, Sydney, Australia.

Fan, Bin, et al., "MemC3: Compact and Concurrent MemCache with Dumber Caching and Smarter Hashing," NSID'13, 10th USENIX Symposium on Networked Systems Design and Implementation, Apr. 2003, 14 pages, Lombard, IL, USA.

Fan, Bin, et al., "Small Cache, Big Effect: Provable Load Balancing for Randomly Partitioned Cluster Services," SOCC'11, 2nd ACM Symposium on Cloud Computing, Oct. 27-28, 2011, 12 pages, ACM, Cascais, Portugal.

Fan, Bin, et al., "When Cycles are Cheap, Some Tables Can Be Huge," HotOS XIV, May, 2013, 6 pages.

Kalia, Anuj, et al., "Using RDMA Efficiently for Key-Value Services," SIGCOMM'14, Aug 17-22, 2014, 15 pages, ACM, Chicago, IL, USA.

Li, Xiaozhou, et al., "Algorithmic Improvements for Fast Concurrent Cuckoo Hashing," EuroSys'14, Apr. 13-16, 2014, 14 pages, ACM, Amsterdam, Netherlands.

Lim, Hyeontaek, et al., "MICA: A Holistic Approach to Fast In-Memory Key-Value Storage," NSDI'14, 11th USENIX Symposium on Networked Systems Design and Implementation, Apr. 2-4, 2014, 17 pages, Usenix Association, Seattle, WA, USA.

Lim, Hyeontaek, et al., "Practical Batch-Updatable External Hashing with Sorting," Meeting on Algorithm ngineering and Experiments (ALENEX), Jan., 2013, 10 pages.

Lim, Hyeontaek, et al., "SILT: A Memory-Efficient, High-Performance Key-Value Store," SOSP'11, 23rd ACM Symposium on Operating Systems Principles, Oct. 23-26, 2011, 13 pages, ACM, Cascais, Portugal.

Lloyd, Wyatt, et al., "Don't settle for Eventual: Scalable Causal Consistency for Wide-Area Storage with COPS," SOSP'11, 23rd ACM Symposium on Operating Systems Principles, Oct. 23-26, 2011, 16 pages, ACM, Cascais, Portugal.

Moraru, Iulian, et al., "Exact Pattern Matching with Feed-Forward Bloom Filters," ACM Journal of Experimental Algorithmics, May 2011, 19 pages, vol. 16, No. 16, Article 2.1, ACM.

Moraru, Iulian, et al., "Fast Cache for Your Text: Accelerating Exact Pattern Matching with Feed-Forward Bloom Filters," Sep. 2009, 26 pages, School of Computer Science, Carnegie Mellon University, Pittsburgh, PA, USA.

Phanishayee, Amar, et al., "Flex-KV: Enabling High-performance and Flexible KV Systems," MBDS'12, Workshop on Management of Big Data Systems, Sep. 21, 2012, 6 pages, ACM, San Jose, CA, USA.

Snoeren, Alex C., et al., "Fine-Grained Failover Using Connection Migration," 3rd USENIX Symposium on Internet Technologies and Systems, Mar. 26-28, 2001, 12 pages, USENIX Association, San Francisco, CA, USA.

Vasudevan, Vijay, et al., "Using Vector Interfaces to Deliver Millions of IOPS from a Networked Key-value Storage Server," SOCC'12, 3rd ACM Symposium on Cloud Computing, Oct. 14-17, 2012, 13 pages, ACM, San Jose, CA USA.

Zhou, Dong, et al., "Scalable, High Performance Ethernet Forwarding with CuckooSwitch," CoNEXT'13, 9th International Conference on Emerging Networking Experiments and Technologies, Dec. 9-12, 2013, 12 pages, ACM, Santa Barbara, CA, USA.

Non-Published commonly owned U.S. Appl. No. 15/365,887, filed Nov. 30, 2016, 36 pages, Barefoot Networks, Inc.

Eisenbud, Daniel E., et al., "Maglev: A Fast and Reliable Software Network Load Balancer," 13th USENIX Symposium on Networked Systems Design and Implementation 16, 2016, 13 pages, USENIX Association, Santa Clara, CA, USA.

Gandhi, Rohan, et al., "Duet: Cloud Scale Load Balancing with Hardware and Software," SIGCOMM'14, Aug. 17-22, 2014, 12 pages, ACM, Chicago, IL, USA.

Gandhi, Rohan, et al., "Rubik: Unlocking the Power of Locality and End-point Flexibility in Cloud Scale Load Balancing," Proceedings of the 2015 USENIX Annual Technical Conference, Jul. 8-10, 2015, 13 pages, USENIX Association, Santa Clara, CA, USA.

Handigol, Nikhil, et al., "Plug-n-Serve: Load Balancing Web Traffic using OpenFlow," ACM SIGCOMM 2009 Demo, Aug. 2009, 2 pages, Barcelona, Spain.

Kang, Nanxi, et al., "Efficient Traffic Splitting on Commodity Switches," CoNEXT'15, Dec. 1-4, 2015, 13 pages, ACM, Heidelberg, Germany.

Patel, Parveen, et al., "Ananta: Cloud Scale Load Balancing," SIGCOMM'13, Aug. 12-16, 2013, 12 pages, ACM, Hong Kong, China.

Wang, Richard, et al., "OpenFlow-Based Server Load Balancing Gone Wild," Proceedings of the 11th USENIX Conference on Hot topics in management of internet, cloud, and enterprise networks and services, Jan. 2011, 6 pages.

\* cited by examiner

FORWARDING ELEMENT WITH A DATA PLANE LOAD BALANCER

BACKGROUND

Load balancers are commonly used to spread the traffic load for a service to a number of computing devices that are available to provide the service. Since load balancers often serve as gathering points for the data traffic, there is a constant need to increase the speed of their operations. Also, load balancers need to dynamically react quickly to changes to the available pool of computing devices that can provide the load-balanced service. Ideally, this rapid and dynamic reaction should not come at the expense of inefficient consumption of hardware and software resources.

SUMMARY

Some embodiments of the invention provide a forwarding element that has a data-plane circuit (data plane) that can be configured to implement one or more load balancers. The data plane has several stages of configurable data processing circuits, which are typically configured to process data tuples associated with data messages received by the forwarding element in order to forward the data messages within a network. However, in some embodiments, the configurable data processing circuits of the data plane can also be configured to implement one or more load balancers in the data plane. In some embodiments, the forwarding element has a control-plane circuit (control plane) that configures the configurable data processing circuits of the data plane, while in other embodiments, a remote controller configures these data processing circuits.

The data plane of the forwarding element of some embodiments is configured to implement a load balancer that forwards message flows to different nodes of a node group. This load balancer includes a set of one or more storages to store several address mapping sets with each address mapping set corresponding to a different set of nodes in the node group. It also includes a destination selector that receives a set identifier for each message flow, and selects a node for the message flow from the mapping set identified by the set identifier received for the message flow.

The load balancer also includes a set identifier (ID) allocator and a cache that specify set identifiers that identify the mapping sets to use for the message flows. The load balancer further includes a connection storage that is placed before the set ID allocator and the cache. For each of several message flows previously processed by the load balancer, the connection storage stores an identifier (i.e., a message flow identifier) that identifies the flow and a set identifier that the set ID allocator previously generated for the message flow.

In some embodiments, the load balancer has a publisher that supplies the control plane with set identifiers generated by the set ID allocator so that the control plane can write these values in the connection storage. For a received message, the connection storage determines whether it stores a set identifier for the received message's flow identifier. If so, the connection storage outputs the stored set identifier for the destination selector to use. If not, the connection storage directs the set ID allocator to output a set identifier for the destination selector to use.

In some embodiments, the set ID allocator outputs a set identifier for each message flow it processes during transient intervals when the node group is not being modified. On the other hand, the allocator outputs two set identifiers for each message flow it processes during update intervals when the node group is being modified. One set identifier (called old identifier or old ID) is for the set of nodes in the node group before the update, while the other set identifier (called new identifier or new ID) is for the set of nodes in the group after the update.

In some embodiments, each update interval has two sub-intervals, and the set ID allocator outputs old and new identifiers only in the second sub-interval of the update interval. During the first sub-interval, the set ID allocator outputs the old identifiers for the message flows that it processes and the cache stores the old identifiers that it receives during this sub-interval. During the second sub-interval, the set ID allocator outputs the old and new set IDs for each message flow that it processes to the cache. The cache then (1) determines whether it stored during the first sub-interval the old set identifier for the message flow identifier, (2) if so, outputs the old set identifier to the destination selector, and (3) if not, outputs the new set identifier to the destination selector. In some embodiments, the set ID allocator writes the old and new set IDs in the data tuples that the data plane processes for the messages, the cache outputs either the old or new set ID by storing a hit or miss in these data tuples, and the destination selector selects either the old or new set ID based on whether the cache output a hit or a miss.

The load balancer's cache operates differently in other embodiments. In some of these embodiments, the cache does not store old set identifiers during the first sub-interval. Instead, the cache only stores a flow identifier of each flow for which the version identifier assigned an old set identifier during the first sub-interval, or a substitute value for this flow identifier. In the embodiments in which the cache stores the flow identifiers of the flows for load balancing during the first sub-interval, the cache determines during the second sub-interval whether it stores the flow identifier of a flow for load balancing. If so, it outputs a hit. Otherwise, it outputs a miss.

One example of a substitute value for a flow identifier that the cache stores in other embodiments is a series of bit 1 values that the cache stores at a series of locations identified by a series of hash functions that are applied to the flow identifier. During the second sub-interval of the update interval, the cache computes the series of hash functions on each message's flow identifier that it receives and then determines whether each of the locations identified by the computed series of hash values only store 1 values. If any of these locations stores a 0 value, the cache determines that the message flow was not seen during the first sub-interval, and outputs a cache miss. On the other hand, when all the locations identified by the series of hash values store only 1's, the cache determines that the message flow was seen during the first sub-interval, and outputs a cache hit.

Also, during an update interval, the publisher provides to the control plane the old set identifiers that are assigned during the first sub-interval, along with the message flow identifiers of the message flows to which these set identifiers are assigned. The control plane then stores these set identifiers in the load balancer's connection storage for the respective message flows. In some embodiments, the publisher also provides to the control plane the new set identifiers that are assigned during the second sub-interval when the cache outputs a miss. The publisher provides each new set identifier for a message flow with that flow's identifier so that the control plane can then store these identifiers in the load balancer's connection storage for the respective message flows.

Because of the control plane configuration operation, the second sub-interval in some embodiments is set to be larger than the expected duration of time that it would take the control-plane circuit to store in the connection storage the set identifiers that are stored in preceding first sub-interval in the cache storage. In some embodiments, the first sub-interval is also equal or larger than this expected duration, and the second sub-interval is an integer multiple (e.g., one times, two times, or three times) of the first sub-interval in some embodiments.

In some embodiments, the control-plane circuit configures the data processing circuits of the data plane to implement the set ID allocator to operate either in a transient-interval mode to output one set identifier for each message flow, or in an update-interval mode to output old and new set identifiers for each message flow. More generally, the control-plane configures the data processing circuits of the data plane to implement the connection storage, the set ID allocator, the cache and the destination selector of the load balancer of some embodiments. In some embodiments, the data plane includes stateful arithmetic logic units, one or more of which are configured to implement the cache that is used during update intervals when the node group is being modified. Also, in some embodiments, the connection storage, the set ID allocator and the cache write to the processed data tuples in order to provide their outputs to subsequent stages of the load balancer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a forwarding element that has a data-plane circuit (data plane) that can be configured to implement one or more load balancers. The data plane has several stages of configurable data processing circuits, which are typically configured to process data tuples associated with data messages received by the forwarding element in order to forward the data messages within a network. In addition, in some embodiments, the configurable data processing circuits of the data plane can also be configured to implement one or more load balancers in the data plane. In some embodiments, the forwarding element has a control-plane circuit (control plane) that configures the configurable data processing circuits of the data plane, while in other embodiments, a remote controller configures these data processing circuits.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
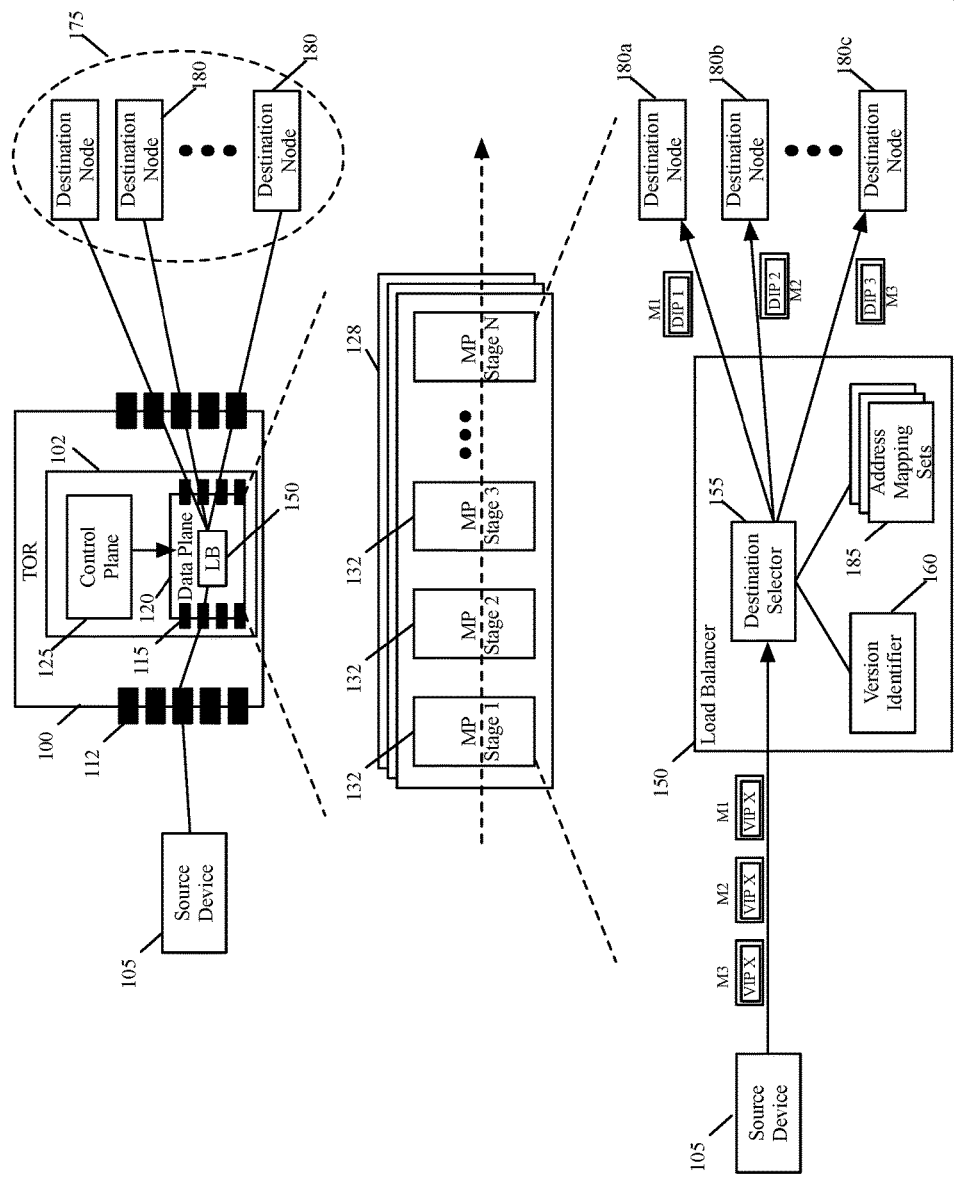
FIG. 1 illustrates a forwarding element of some embodiments that can be configured to perform load balancing.

FIG. 1 illustrates an example of a forwarding element 100 of some embodiments that is not only used to forward data messages in a network, but is also used to perform load balancing operations. Although the load-balancing forwarding elements can be different types of forwarding elements (such as different types of switches, routers, bridges, etc.) in different embodiments, the forwarding element 100 in the example illustrated in FIG. 1 is a top-of-rack (TOR) switch that is deployed at an edge of the network to connect directly to hosts and/or standalone computers 105 that serve as the sources of data messages.

In other embodiments, the forwarding element is deployed as a TOR switch of a rack of destination nodes (e.g., host/standalone computers or appliances). The forwarding element of yet other embodiments is deployed as non-edge forwarding element in the interior of the network. A non-edge forwarding element forwards data messages between forwarding elements in the network (i.e., through intervening network fabric), while an edge forwarding element forwards data messages to and from edge compute device to each other, to other edge forwarding elements and/or to non-edge forwarding elements.

As shown, the forwarding element 100 includes (1) one or more forwarding integrated circuits (ICs) 102 that performs the forwarding operations of the forwarding element, and (2) physical ports 112 that receive data messages from, and transmit data messages to, devices outside of the forwarding element 100. The forwarding ICs include a data plane circuit 120 (the "data plane") and a control plane circuit 125 (the "control plane"). In some embodiments, the control plane 125 of a forwarding element is implemented by one or more general purpose central processing units (CPUs), while the data plane 120 of the forwarding element is implemented by application specific integrated circuit (ASIC) that is custom made to perform the data plane operations.

The data plane performs the forwarding operations of the forwarding element 100 to forward data messages received by the forwarding element to other devices, while the control plane configures the data plane circuit. The data plane 120 also includes ports 115 that receive data messages to process, and transmit data messages after they have been processed. In some embodiments, some ports 115 of the data plane 120 are associated with the physical ports 112 of the forwarding element 100, while other ports 115 are associated with other modules of the control plane 125 and/or data plane 120.

The data plane includes several pipelines 128 of configurable message-processing stages 132 that can be configured to perform the data-plane forwarding operations of the forwarding element to process and forward data messages to their destinations. These message-processing stages perform these forwarding operations by processing data tuples associated with the data messages (e.g., header vectors generated from the headers of the messages) received by the forwarding element in order to determine how to forward the messages. As further described below, the message-processing stages in some embodiments include match-action units (MAUs) that try to match data tuples (e.g., values from the header vectors) of messages with table records that specify actions to perform on the data tuples.

In addition to processing messages as part of their forwarding operations, the message-processing stages 132 can be configured to implement one or more load balancers 150 in the data plane of the TOR switch 100. The load balancer 150 distributes data message flows that are addressed to different groups of destination nodes among the nodes of each addressed group. For example, in some embodiments, the load balancer distributes data messages that are addressed to a virtual address that is associated with a group of destination nodes to different destination nodes in the addressed group. To do this, the load-balancing operations in some embodiments perform destination network address translation (DNAT) operations that convert the group virtual address to different network addresses of the different destination nodes in the group. The destination nodes are service nodes (such as middlebox service nodes) in some embodiments, while they are data compute nodes (such as webservers, application servers, or database servers) in other embodiments. Hence, in some embodiments, the load-balanced node groups can be service node groups or compute node groups.

In FIG. 1, the load balancer 150 is shown distributing data messages that are addressed to a virtual IP (VIP) address X of a destination node group 175, by converting (i.e., network address translating) these virtual addresses to destination IP (DIP) addresses of the destination nodes 180 of this group 175. This figure illustrates three messages M1-M3 that have VIP X as their destination IP addresses being directed to three destination nodes 180a, 180b and 180c after their destination IP addresses have been replaced with the destination IP address 1, 2, and 3 of these three nodes 180a, 180b, and 180c.

To do its DNAT operation, the load balancer includes a destination address selector 155, a version identifier 160, and multiple address mapping sets 185. The destination address selector 155 replaces a group VIP address in the messages that it receives with different destination IP addresses (DIPs) of the different destination nodes 180 in the group 175. For a data message, the destination address selector 155 uses the version identifier 160 to identify the address mapping set 185 to use to identify the DIP address to replace the message's VIP destination IP address.

For each message flow that is processed using a mapping data set, the destination selector (1) uses a set of one or more flow attributes (e.g., a hash of the flow's five-tuple identifier) to identify a record in the mapping data set 185 identified by the retrieved version number, and (2) uses this identified record to translate the message's VIP destination IP address to a DIP address of one of the nodes in the load-balanced destination group. In some embodiments, each mapping data set is stored in a different DNAT table, and hence the version numbers supplied by the version identifier 160 identify a different DNAT table from which the load balancer should retrieve the DIPs for the VIPs specified in the received data messages.

In other embodiments, the two or more different mapping data sets can be stored in the same table. Also, in other embodiments, the destination selector 155 of the load balancer uses other techniques to perform its DNAT operations. For example, in some embodiments, the destination selector computes hashes from the header values of messages that it processes to compute values that directly index into DNAT tables, which provide DIP addresses of the nodes in a load-balanced node group.

Each time a node 180 is added (e.g., instantiated or allocated) to a load-balanced group 175, and its DIP should be used, the control plane 125 of some embodiments creates a new mapping data set 185 (e.g., a new DNAT table) to store all the available DIPs for the new flows that it receives after the addition of the new node. Also, in some embodiments, each time a node is removed (e.g., fails or is shut off) from the group, and its DIP should no longer be used, the control plane 125 of some embodiments creates a new mapping data set to store the available DIPs for the new flows that it receives after removal of the node. In some embodiments, each mapping data set is a DNAT table that stores a pseudo-random distribution of the DIPs that were available at the time of the creation of the DNAT table. A pseudo-random distribution of DIPs in a DNAT table in some embodiments entails distributing the DIPs that are available at the time of the creation of the DNAT table across the table's addressable locations.

In some embodiments, the load balancer 150 is a stateful load balancer. Accordingly, even after a new mapping data set (e.g., a new DNAT table) is created, the load balancer 150 continues to process all prior flows that do not go to a removed destination node, by using one of the previously created mapping data sets that it was previously using to load balance the flows. In other words, some embodiments create a new mapping data set (e.g., a new version of the DNAT table each time a destination node is added or removed) in order to allow newly received flows to use the new mapping data set, while allowing the older flows that are being processed to use prior mapping data sets (e.g., older DNAT tables) so long as these older flows are not being directed to a removed destination node. For older flows that were being directed to a removed destination node, the load balancer in some embodiments directs these flows to other destination nodes that are still operating.

To properly distribute previously identified flows, the data-plane load balancer of the forwarding element of some embodiments has a connection storage to store the mapping set identifier (e.g., the DNAT table version number) for each of a number of previously processed flows. The load balancer also has a mapping set identifier allocator (e.g., a version identifier) and a cache that respectively assign set identifiers (i.e., set IDs) and store the set identifiers for flows that are processed during an update period, during which the control plane is modifying the definition (e.g., the membership) of the load-balanced destination node group. During this update period, the set identifiers that are stored in the cache are published from the data plane to the control plane, so that the control plane can store these set identifiers in a control-plane optimized manner in the connection storage of the data plane.

Figure 2:
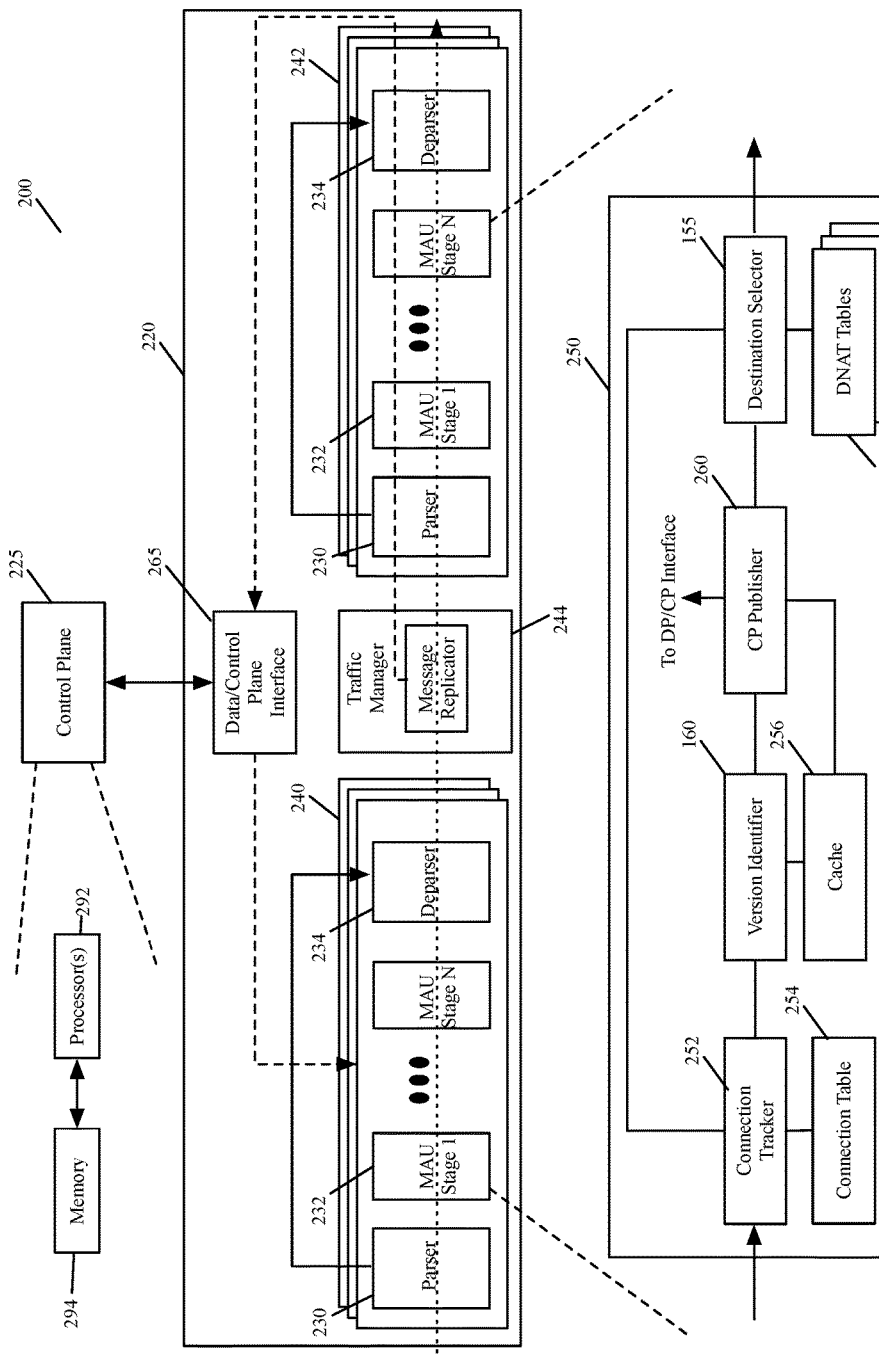
FIG. 2 illustrates a forwarding element of some embodiments that can be configured to perform load balancing.

FIG. 2 illustrates a more-detailed example of a load balancer 250 of some embodiments, which includes the above-described connection storage, set ID allocator and cache. This figure also provides more-detailed examples of a data plane 220 and a control plane 225 of a forwarding element 200 of some embodiments. As shown, the data plane 220 includes multiple message-processing pipelines, including multiple ingress pipelines 240 and egress pipelines 242. The data plane 220 also includes a traffic manager 244 that is placed between the ingress and egress pipelines 240 and 242. The traffic manager 244 serves as a crossbar switch that directs messages between different ingress and egress pipelines.

Each ingress/egress pipeline includes a parser 230, several MAU stages 232, and a deparser 234. A pipeline's parser 230 extracts a message header from a data message that the pipeline receives for processing. In some embodiments, the extracted header is in a format of a header vector (HV) that is processed, and in some cases modified, by successive MAU stages 232 as part of their message processing operations. The parser of a pipeline 230 passes the payload of the message to the pipeline's deparser 234 as the pipeline's MAU 232 operate on the header vectors. In some embodiments, the parser also passes the message header to the deparser 234 along with the payload (i.e., the parser passes the entire message to the deparser).

When a pipeline 240/242 finishes processing a data message, and the message has to be provided to the traffic management stage (in case of an ingress pipeline) or to a port 115 (in case of an egress pipeline) to be forwarded to the message's next hop (e.g., to its destination compute node or next forwarding element) or to another module of the data or control plane, a deparser 234 of the pipeline in some embodiments produces the data message header from the message's header vector that was processed by the pipeline's last MAU stage, and combines this header with the data message's payload. In some embodiments, the deparser 234 uses part of the header received from the parser 230 of its pipeline to reconstitute the message from its associated header vector.

In some embodiments, one or more MAU stages 232 of one or more ingress and/or egress pipelines are configured to implement the components of the load balancer 250. As shown, these components include a connection tracker 252, a connection table 254, a DNAT-table version identifier 160, a cache storage 256, a control-plane (CP) publisher 260, a destination address selector 155, and multiple DNAT tables 285. The load balancer 250 that is implemented by these components, spreads message flows that are addressed to different VIP address of different load-balanced groups to different nodes in each group. When the load balancer 250 is used to distribute the message flows for multiple node groups, the load balancer 250 in some embodiments uses multiple different sets of DNAT tables for multiple different load balanced node groups.

For each load-balanced node group, each DNAT table 285 in that group's set of DNAT tables stores a different address mapping set that specifies different DIPs for different flow identifiers of the data message flows that specify the VIP address of the load-balanced node group as their destination IP address. In some embodiments, each DNAT table corresponds to a different set of nodes in the table's associated node group. The destination selector 155 receives the version number for each message flow, and selects a DIP for the message flow from the DNAT table identified by the received version number. To select a DIP for a message flow from a DNAT table, the destination selector in some embodiments (1) computes an index into the table from the flow's identifier (e.g., computes a hash of the flow's five tuple), and then (2) uses this index value to identify a DNAT-table record that stores a DIP address or a value from which the DIP address can be generated.

To provide the DNAT version number to the DIP selector, the load balancer uses the DNAT-table version identifier 160 and the cache 256. The load balancer also includes the connection tracker 252 and the connection table 254 that are placed before the version identifier 160 and the cache 256. For each of several message flows previously processed by the load balancer, the connection tracker 252 stores in the connection table 254 a message flow identifier and a version number, which the version identifier 160 previously allocated to the message flow.

In some embodiments, the CP publisher 260 supplies the control plane 225 with DNAT-table version numbers that the version identifier 160 allocates each message flow so that the control plane can direct the connection tracker 252 to write these version numbers in the connection table 254 in a control-plane optimized manner, e.g., by using cuckoo hashing scheme. The connection table 254 is a hash-addressable proxy hash table as described in U.S. Pat. No. 9,529,531, which is incorporated herein by reference.

For a received message, the connection tracker 252 initially determines whether the connection table 254 stores a version number for the received message's flow identifier. If so, the connection tracker 252 outputs the stored version number for the destination selector 155 to use. If not, the connection tracker 252 directs the version identifier 160 to output a version number for the destination selector 155 to use.

In some embodiments, the version identifier 160 outputs one version number for each message flow it processes for a node group during transient intervals when the node group is not being modified. On the other hand, the version identifier 160 outputs two version numbers for each message flow it processes during update intervals when the node group is being modified. One version number (called old version number) identifies the DNAT table for the set of nodes in the node group before the update, while the other version number (called new version number) identifies the DNAT table for the set of nodes in the group after the update.

In some embodiments, each update interval has two sub-intervals, and the version identifier 160 outputs old and new version numbers only in the second sub-interval of the update interval. During the first sub-interval, the version identifier 160 outputs the old version numbers for the message flows that it processes and the cache 256 stores the old version numbers that it receives during this sub-interval.

During the second sub-interval, the version identifier 160 outputs old and new version numbers for each message flow that it processes to the cache 256. The cache then (1) determines whether it stored during the first sub-interval the old version number for the message flow identifier, (2) if so, outputs the old version number to the destination selector 155, and (3) if not, outputs the new version number to the destination selector. In some embodiments, the version identifier 160 writes the old and new version numbers in the header vectors that the data plane processes for the messages, the cache outputs either the old or new version number by storing a hit or miss in these header vectors, and the destination selector selects either the old or new version number from the header vectors based on whether the cache stores hit or miss values in the header vectors.

The load balancer's cache 256 operates differently in other embodiments. In some of these embodiments, the cache does not store old set identifiers during the first sub-interval. Instead, the cache only stores a flow identifier of each flow for which the version identifier assigned an old set identifier during the first sub-interval, or a substitute value for this flow identifier. In the embodiments in which the cache stores the flow identifiers of the flows for load balancing during the first sub-interval, the cache determines during the second sub-interval whether it stores the flow identifier of a flow for load balancing. If so, it outputs a hit. Otherwise, it outputs a miss.

One example of a substitute value for a flow identifier that the cache stores in other embodiments is a series of bit 1 values that the cache stores at a series of locations identified by a series of hash functions that are applied to the flow identifier. During the second sub-interval of the update interval, the cache computes the series of hash functions on each message's flow identifier that it receives and then determines whether each of the locations identified by the computed series of hash values only store 1 values. If any of these locations stores a 0 value, the cache determines that the message flow was not seen during the first sub-interval, and outputs a cache miss. On the other hand, when all the locations identified by the series of hash values store only 1's, the cache determines that the message flow was seen during the first sub-interval, and outputs a cache hit.

Also, during an update interval, the CP publisher 260 provides to the control plane the version numbers that are assigned to the message flows during the first sub-interval, along with the message flow version numbers of the messages flows to which these set version numbers are assigned. The control plane then directs the connection tracker 252 to store these version numbers in the connection table for the respective message flows in a control-plane optimized manner. In some embodiments, the publisher also provides to the control plane the new version numbers that are assigned during the second sub-interval when the cache outputs a miss. The publisher provides each new version number for a message flow with that flow's identifier so that the control plane can then store these version numbers in the connection tracker 252 for the respective message flows.

Because of this configuration operation, the second sub-interval in some embodiments is set to be larger than the expected duration of time that it would take the control plane 225 (1) to receive the version numbers, which are identified in preceding first sub-interval, from the CP publisher in the data plane, and (2) to direct the connection tracker 252 to store these version numbers in the connection table 254. In some embodiments, the first sub-interval is also equal to or larger than this expected duration, and the second sub-interval is an integer multiple (e.g., one times, two times, or three times) of the first sub-interval. Also, in some embodiments, the CP publisher supplies to the control plane 225 version numbers that the version identifier 160 allocates to new message flows that it processes during transient, non-update intervals, so that the control plane can direct the connection tracker 252 to store these version numbers for these newly processed flows in the connection table 254.

In some embodiments, the control plane 225 configures the data processing circuits of the data plane to implement the version identifier 160 to operate either in a transient-interval mode to output old version numbers for each message flow, or in an update-interval mode to output old and new version numbers for each message flow. More generally, the control plane configures the data processing circuits of the data plane to implement the connection tracker 252, connection table 254, the version identifier 160, the cache 256, the CP publisher 260, the destination selector 155 and DNAT tables 285 of the load balancer of some embodiments. In some embodiments, the data plane includes stateful arithmetic logic units, one or more of which are configured to implement the cache 256 that is used during update intervals, when the node group is being modified. Also, in some embodiments, the connection tracker 252, the version identifier 160 and the cache 256 write to the processed header vectors in order to provide their outputs to subsequent stages of the load balancer.

The control plane 225 includes one or more processors 292 (such as a microprocessor with multiple processing cores or units) that execute instructions, and a memory 294 that stores instructions. These instructions can be specified by (1) a manufacturer of the network forwarding element that uses the forwarding element 200, (2) a network administrator that deploys and maintains the network forwarding element, or (3) one or more automated processes that execute on servers and/or network forwarding elements that monitor network conditions. A processor 292, or another circuit of the control plane, communicates with the data plane (e.g., to configure the data plane or to receive statistics from the data plane) through the control/data plane interface 265.

One of the sets of instructions (i.e., one of the programs) in the memory 294 that a processor 292 of the control plane 225 periodically executes in some embodiments identifies an optimal storage of the version numbers in the connection table 254. For instance, in some embodiments, the processor executes a cuckoo hashing program that identifies an optimal way of storing the version numbers in the connection table 254 to quickly identify the version numbers for the most frequently processed message flows.

Figure 3:
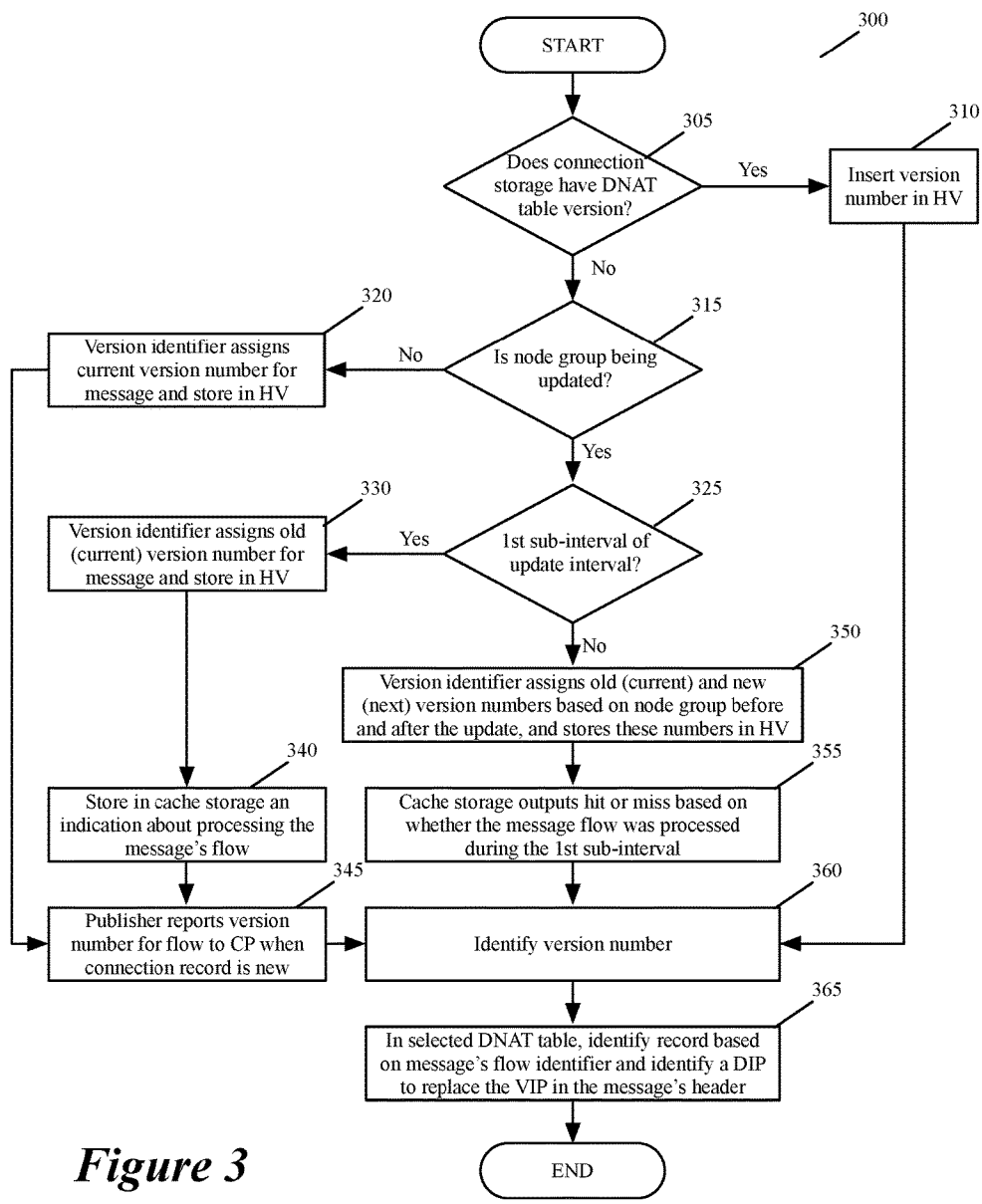
FIG. 3 illustrates a load balancing process of some embodiments.

FIG. 3 illustrates a process 300 that the load balancer 250 performs for a message that it processes. In some embodiments, each of the operations of this process is conceptual representation of a logical operation that is performed by one or more match-action units that implement one or more of the components of the load balancer 250 that were described above by reference to FIG. 2.

As shown, the connection tracker 252 initially determines (at 305) whether the connection table 254 stores a version number for the received message's associated flow. To do this, the connection tracker in some embodiments generates a hash of the message's flow identifier (e.g., the message's five-tuple identifier), and uses this hash to identify a location in the hash-addressable connection table 254. When this location is populated with a version number (e.g., when this location does not specify a default, empty set value), the connection tracker retrieves this version number along with a proxy hash value stored at this location. This proxy hash value is another hash value that is derived from a message flow identifier.

The connection tracker then compares the retrieved proxy hash value with the value of a proxy hash generated from the received message's flow identifier. When these two proxy hash values match, the connection tracker determines that the version number retrieved from the connection table is the version number for the received message. On the other hand, the connection tracker determines that the connection table does not store a version number for the received message when these two proxy values do not match, or when no version number is stored in the connection table at the hash addressed location identified for the received data message. As described in above-incorporated U.S. Pat. No. 9,529,531, the hash addressed location identifies multiple records in the connection table in some embodiments, and the connection tracker examines each of these records to determine whether any of them specify a version number for the received message's flow identifier.

When the connection tracker determines (at 305) that the connection table 254 stores a version number for the received message's associated flow, the connection tracker writes (at 310) this version number in the header vector that the data plane is processing for the message. From 310, the process 300 then transitions to 360, which will be described below. On the other hand, when the connection tracker determines (at 305) that the connection table 254 does not store a version number for the received message's associated flow, the connection tracker leaves the version number for this message unpopulated, and the process transitions to 315.

At 315, the version identifier 160 determines whether the load balancer is currently operating in an update mode for the node group identified by the VIP address in the received message's destination IP address. As mentioned above, the load balancer operates in such an update mode when the control plane puts the version identifier in an update mode in order to update the membership of a particular load-balanced node group.

When the version identifier determines (at 315) that it is not operating in an update mode for the node grouped addressed by the received message, the version identifier 160 (at 320) identifies the current DNAT-table version number that it maintains for this node group, and writes this number in the header vector that the data plane is processing for the message. From 320, the process 300 then transitions to 345, which will be described below.

On the other hand, when the version identifier determines (at 315) that it is operating in an update mode for the node grouped addressed by the received message, the version identifier determines (at 325) whether it is operating in the first sub-interval of the update interval. If so, the version identifier outputs (at 330) the current DNAT-table version number that it maintains for this node group by writing this number in the header vector that the data plane is processing for the message. After 330, the cache 256 (at 340) stores an indication regarding the processing of the message's flow during the first sub-interval. As mentioned above, the cache 256 stores this indication differently in different embodiments. In some embodiments, it stores the version number assigned to the message along with its flow identifier or at a location identified by a hash of the flow identifier. In other embodiments, it stores the flow identifier of the processed message. In still other embodiments, it stores a series of bit values (e.g., 1's) in a series of locations identified by computing a series of hash values from the message's flow identifier. From 340, the process then transitions to 345.

At 345, the publisher 260 extracts this version number and the message flow identifier, and stores these two values (version number and flow identifier) for reporting to the control plane when these two values represent a new connection record that has not previously been reported to the control plane. In some embodiments, the publisher 260 maintains a storage to record some amount of previously reported connection records, and checks this storage to discard (i.e., to not report) connection records that it has previously reported to the control plane. In other embodiments, the publisher does not have such a storage, and reports to the control plane all connection records output by the version identifier 160 and the cache 256. After 345, the process transitions to 360, which will be described below.

When the version identifier determines (at 325) that it is operating in the second sub-interval of the update interval for the node grouped addressed by the received message, the version identifier (at 350) outputs the current DNAT-table version number and the next DNAT-table version number that it maintains for this node group by writing these numbers in the header vector that the data plane is processing for the message. The current DNAT-table version number serves as the old version number and the next DNAT-table version number serves as the new version number.

Next, at 355, the cache 256 determines whether it stores an indication that the message's flow was processed during the first sub-interval. If so, the cache outputs a hit value. Otherwise, it outputs a miss value. In some embodiments, the cache records for a node group are purged after each update interval ends, so that the indications that it stores for the node group pertain only to the indications stored during the first sub-interval of each update interval for that node group. Also, in some embodiments, the cache outputs a hit or miss value for a received message by writing this value in the header vector that the data plane is processing for the message. From 355, the process transitions to 360.

At 360, the destination selector 155 identifies the DNAT-table version number for the received message. When the process transitions to 360 from 310 or 345 (i.e., when the load balancer operates in a transient, non-update interval or in the first sub-interval of an update interval for a node group addressed by the received message), the destination selector 155 identifies (at 360) the version number by extracting this number form the header vector that the data plane processes for the received message. On the other hand, when the process transitions to 360 from 355 (i.e., when the load balancer operates in the second sub-interval of an update interval for a node group addressed by the received message), the destination selector 155 selects the DNAT-table version number for the received message as (1) the old version number when the cache 256 stores a hit value in the header vector, or (2) the new version number when the cache 256 stores a miss value in the header vector.

Next, at 365, the destination selector 155 (1) identifies, for the received message, a record in the DNAT table corresponding with the version number identified at 360, (2) extract a DIP value from this record, and (3) replaces the VIP address in the received message with the extracted DIP value. In some embodiments, the destination selector identifies the record in the DNAT table based on the received message's flow identifier (e.g., by using this message's five-tuple identifier or a hash of this five-tuple value as an index into the DNAT table). Also, in some embodiments, the destination selector 155 replaces the VIP address with the DIP address by writing the DIP address in the header vector that the data plane processes for the received data message. As mentioned above, this header vector is converted into a header for the data message before the data message is supplied by the data plane to one of its ports for transmission out of the forwarding element. After 365, the process ends.

Figure 4:
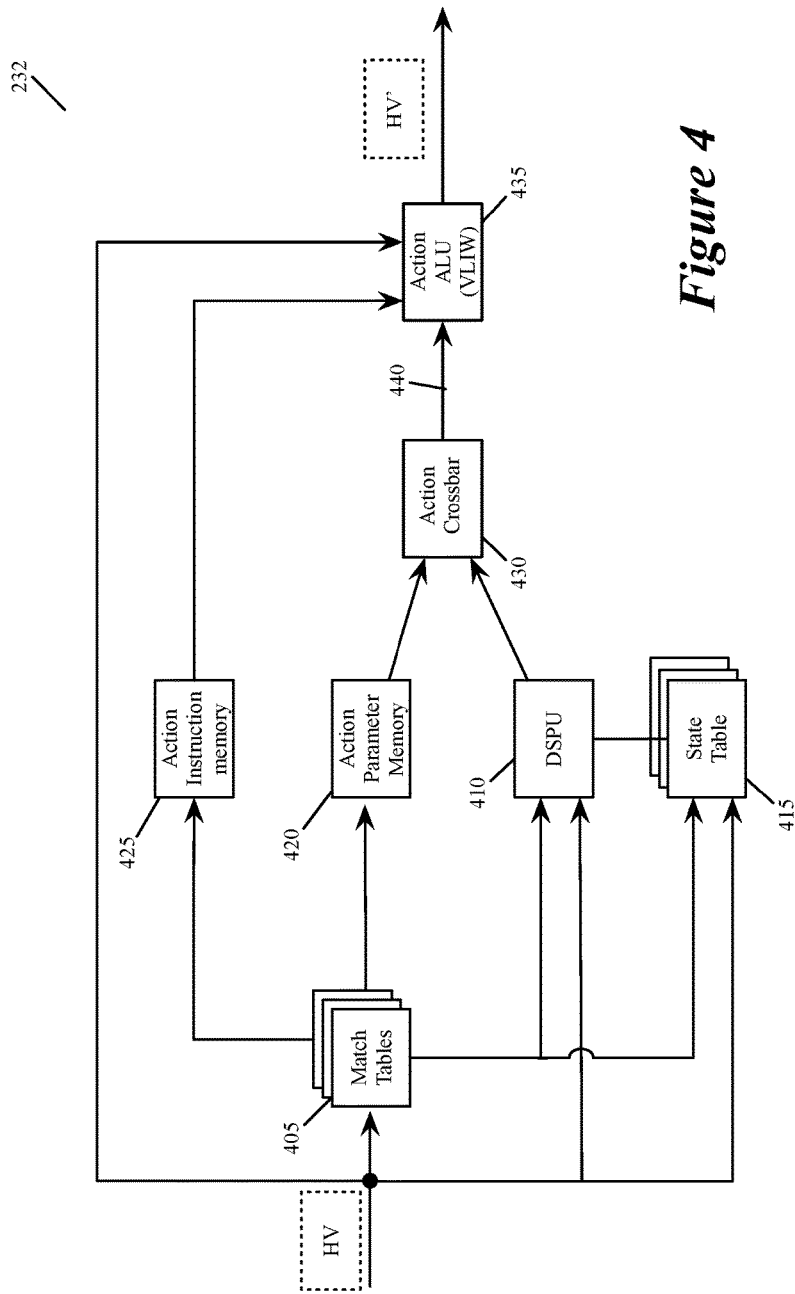
FIG. 4 illustrates a match-action unit of some embodiments.

FIG. 4 illustrates an example of a match-action unit of some embodiments. As mentioned above, an ingress pipeline 240 or egress pipeline 242 in some embodiments has several MAU stages 232, each of which includes message-processing circuitry for forwarding received data messages and/or performing stateful operations based on these data messages. These operations are performed by processing values stored in the header vectors of the data messages.

As shown in FIG. 4, the MAU 232 in some embodiments has a set of one or more match tables 405, a data plane stateful processing unit 410 (DSPU), a set of one or more stateful tables 415, an action crossbar 430, an action parameter memory 420, an action instruction memory 425, and an action arithmetic logic unit (ALU) 435. The match table set 405 can compare one or more fields in a received message's header vector (HV) to identify one or more matching flow entries (i.e., entries that match the message's HV). The match table set can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote controller supplies flow entries (e.g., the flow-match identifiers and/or action identifiers) to store in one or more match tables.

In some embodiments, the value stored in a match table record that matches a message's flow identifier, or that is accessed at a hash-generated address, provides addresses of records to access in the action parameter memory 420 and action instruction memory 425. The actions performed by the MAU 232 include actions that the forwarding element has to perform on a received data message to process the data message (e.g., to drop the message, or to forward the message to its destination compute node or to other intervening forwarding elements). In some embodiments, these actions also include the load balancing operations described above for the connection tracker 252, version identifier 160 and destination selector 155.

Also, in some embodiments, the value stored in a match table record that matches a message's flow identifier, or that is accessed at a hash-generated address, can provide an address and/or parameter for one or more records in the stateful table set 415, and can provide an instruction and/or parameter for the DSPU 410. As shown, the DSPU 410 and the stateful table set 415 also receive a processed message's header vector. The header vectors can include instructions and/or parameters for the DSPU, while containing addresses and/or parameters for the stateful table set 415.

The DSPU 410 in some embodiments performs one or more stateful operations, while a stateful table 415 stores state data used and generated by the DSPU 410. In some embodiments, the DSPU is a programmable arithmetic logic unit (ALU) that performs operations synchronously with the dataflow of the message-processing pipeline (i.e., synchronously at the line rate). As such, the DSPU can process a different header vector on every clock cycle, thus ensuring that the DSPU would be able to operate synchronously with the dataflow of the message-processing pipeline. In some embodiments, a DSPU performs every computation with fixed latency (e.g., fixed number of clock cycles). In some embodiments, the local or remote control plane provides configuration data to program a DSPU.

In some embodiments, the MAU DSPUs 425 and their stateful tables 450 are used to implement the cache 256, because the stored cached values (e.g., version numbers, flow identifies, or other flow hit indicators) are state parameters that are generated and maintained by the data plane. For a message being processed by the MAU, the DSPU in some embodiments determines whether its stateful table 450 stores cached values for the flow identifier of the message.

The DSPU 410 outputs an action parameter to the action crossbar 430. The action parameter memory 420 also outputs an action parameter to this crossbar 430. The action parameter memory 420 retrieves the action parameter that it outputs from its record that is identified by the address provided by the match table set 405. The action crossbar 430 in some embodiments maps the action parameters received from the DSPU 410 and action parameter memory 420 to an action parameter bus 440 of the action ALU 435. This bus provides the action parameter to this ALU 435. For different data messages, the action crossbar 430 can map the action parameters from DSPU 410 and memory 420 differently to this bus 440. The crossbar can supply the action parameters from either of these sources in their entirety to this bus 440, or it can concurrently select different portions of these parameters for this bus.

The action ALU 435 also receives an instruction to execute from the action instruction memory 425. This memory 425 retrieves the instruction from its record that is identified by the address provided by the match table set 405. The action ALU 440 also receives the header vector for each message that the MAU processes. Such a header vector can also contain a portion or the entirety of an instruction to process and/or a parameter for processing the instruction.

The action ALU 440 in some embodiments is a very large instruction word (VLIW) processor. The action ALU 440 executes instructions (from the instruction memory 435 or the header vector) based on parameters received on the action parameter bus 440 or contained in the header vector. The action ALU stores the output of its operation in the header vector in order to effectuate a message forwarding operation and/or stateful operation of its MAU stage 132. The output of the action ALU forms a modified header vector (HV') for the next MAU stage. In some embodiments, examples of such actions include the writing of the outputs of the connection tracker 252, version identifier 160, and/or destination selector 155 in the header vectors.

In other embodiments, the match tables 405 and the action tables 415, 420 and 425 of the MAU stage 232 can be accessed through other methods as well. For instance, in some embodiments, each action table 415, 420 or 425 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 405. As in the case of a match table 405, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 405 for a message's header vector. As mentioned above, the match table records are identified through direct addressing or record matching operations in some embodiments.

The independent address scheme is similar to the direct addressing scheme except that it does not use the same address that is used to access the match table set 405. Like the direct addressing scheme, the table address in the independent addressing scheme can either be the value extracted from one or more fields of the message's header vector, or it can be a hash of this extracted value. In some embodiments, not all the action tables 415, 420 and 425 can be accessed through these three addressing schemes, e.g., the action instruction memory 425 in some embodiments is accessed through only the direct and indirect addressing schemes.

While the invention has been described with reference to numerous specific details, one of ordinary skill in the art will recognize that the invention can be embodied in other specific forms without departing from the spirit of the invention. Accordingly, one of ordinary skill in the art would understand that the invention is not to be limited by the foregoing illustrative details, but rather is to be defined by the appended claims.

The invention claimed is:

1. For a network forwarding element, a data-plane forwarding circuit comprising:
    a load balancer to forward message flows to different nodes of a node group, the load balancer comprising:
        (i) a set of storages to store a plurality of different address mapping sets with each address mapping set corresponding to a different set of nodes in the node group;
        (ii) a destination selector to receive a set identifier for each message flow and to select a node for the message flow from the mapping set identified by the set identifier received for the message flow;
        (iii) a set ID allocator to assign (1) a first set identifier for each message flow processed during a first sub-interval of an update interval when the node group is being modified, and (2) first and second set identifiers for each message flow processed during a second sub-interval of the update interval when the node group is being modified; and
        (iv) a cache stage that during the first sub-interval stores values that identify the message flows processed during the first sub-interval, and during the second sub-interval assigns the first set identifier to each message flow when the cache stage stores a value that identifies the message flow as being processed during the first sub-interval, and assigns the second set identifier to each message flow when the cache stages does not store such a value for the message flow.

2. The data-plane forwarding circuit of claim 1 further comprising a plurality of configurable data processing circuits in a plurality of data processing stages, the data processing circuits comprising:
    a plurality of data processing circuits configured to process data tuples associated with data messages received by the forwarding element in order to forward the data messages within a network, and
    a plurality of data processing circuits configured to implement the destination selector and set ID allocator of the load balancer.

3. The data-plane forwarding circuit of claim 2 further comprising:
    a control-plane circuit to configure the configurable data processing circuits of the data plane forwarding circuit, said control-plane circuit to configure a set of data processing circuits that implement the set ID allocator to operate either in a transient-interval mode when the node group is not being modified, or in an update-interval mode when the node group is being modified.

4. The data-plane forwarding circuit of claim 3, wherein during the transient mode, the set ID allocator assigns one set identifier for each message flow.

5. The data-plane forwarding circuit of claim 1 further comprising:
    a plurality of configurable data processing circuits in a plurality of data processing stages,
    wherein the data processing circuits are configured to process data tuples associated with data messages received by the forwarding element, and a subset of data processing circuits further configured to implement the set ID allocator and the cache stage of the load balancer, and
    wherein the set ID allocator and the cache stage output set identifiers and cache hit/miss values by storing the set identifiers and cache hit/miss values in the data tuples processed by the set ID allocator and cache stage.

6. The data-plane forwarding circuit of claim 1, wherein the second sub-interval is an integer multiple of the first sub-interval.

7. The data-plane forwarding circuit of claim 1 further comprising:
    a connection storage to store for each of a plurality previously processed message flows, a message flow identifier and a set identifier,
    a plurality of configurable data processing circuits in a plurality of data processing stages,
    a control-plane circuit to configure the configurable data processing circuits of the data plane forwarding circuit, wherein the control-plane circuit configures a subset of data processing circuits to implement (1) the set ID allocator, and (2) the connection storage.

8. The data-plane forwarding circuit of claim 7, wherein when a message is received, the subset of data processing circuits (1) determines whether the connection storage stores a set identifier for the message's flow identifier, (2) if so, outputs to the stored set identifier for the destination selector to use, and (3) if not, directs the set ID allocator to output a set identifier for the destination selector to use,
    the second sub-interval is larger than an expected duration for the control-plane circuit to store in the connection storage the set identifiers that are stored in preceding first sub-interval in the cache storage.

9. The data-plane forwarding circuit of claim 8, wherein the second sub-interval is an integer multiple of the expected duration.

10. The data-plane forwarding circuit of claim 1 further comprising:
    a connection storage stage to store for each of a plurality previously processed message flows, a message flow identifier and a set identifier,
    wherein for a received message, the connection storage stage (1) determines whether it stores a set identifier for the received message's flow identifier, (2) if so, outputs the stored set identifier for the destination selector to use, and (3) if not, directs the set ID allocator to output a set identifier for the destination selector to use.

11. The data-plane forwarding circuit of claim 10 further comprising:
    a trigger circuit to receive set identifiers output from the set ID allocator along with corresponding message flow identifiers, and to provide at least a subset of the set identifiers and corresponding message flow identifiers to the control-plane circuit to store in the connection storage.

12. The data-plane forwarding circuit of claim 11 further comprising a plurality of configurable data processing circuits in a plurality of data processing stages, the data processing circuits comprising:

a plurality of data processing circuits configured to process data tuples associated with data messages received by the forwarding element in order to forward the data messages within a network, and a plurality of data processing circuits configured to implement the connection storage, the set ID allocator, the cache stage and the destination selector of the load balancer, wherein the connection storage, the set ID allocator and the cache stage write to the processed data tuples in order to provide their outputs.

13. The data-plane forwarding circuit of claim 1 further comprising:

a plurality of configurable data processing circuits in a plurality of data processing stages, the data processing circuits comprising stateful arithmetic logic units at least one of which is configured to implement the cache stage.

* * * * *